United States Patent [19]

Peregrim

[11] Patent Number: 4,881,079
[45] Date of Patent: Nov. 14, 1989

[54] APERTURE RADAR

[75] Inventor: Theodore J. Peregrim, Bedford, Mass.

[73] Assignee: Raytheon Company, Lexington, Mass.

[21] Appl. No.: 138,280

[22] Filed: Dec. 28, 1987

[51] Int. Cl.[4] .................. G01S 7/44; G01S 13/89
[52] U.S. Cl. .................... 342/194; 342/192; 342/195; 342/90
[58] Field of Search ............ 342/194, 196, 146, 25, 342/176, 192, 179, 133, 139, 111, 149, 152, 90, 195; 364/516, 517, 179

[56] References Cited

U.S. PATENT DOCUMENTS

| | | | |
|---|---|---|---|
| 3,181,156 | 4/1965 | Ward | 342/196 |
| 3,885,224 | 5/1975 | Klahr | 367/11 |
| 3,896,434 | 7/1975 | Sirven | 342/132 |
| 3,913,099 | 10/1975 | Wehner et al. | 342/192 |
| 4,034,370 | 7/1977 | Mims | 342/196 X |
| 4,355,311 | 10/1982 | Jain | 342/25 |
| 4,470,048 | 9/1984 | Short | 342/189 |
| 4,562,439 | 12/1985 | Peralta et al. | 342/81 |
| 4,603,331 | 7/1986 | Wehner | 342/192 |
| 4,688,043 | 8/1987 | Welsh | 342/149 |
| 4,707,697 | 11/1987 | Coulter et al. | 342/25 |

Primary Examiner—Thomas H. Tarcza
Assistant Examiner—Gilberto Barrón, Jr.
Attorney, Agent, or Firm—Edmund J. Walsh; Richard M. Sharkansky

[57] ABSTRACT

An improved radar is disclosed wherein an array of digital numbers describing a target area is produced. The numbers have values representing differences in ranges between the radar and reflecting points in an area on the ground illuminated by the radar. The values also represent the differences in angles between the radar and the reflecting points.

4 Claims, 7 Drawing Sheets

APERTURE RADAR

BACKGROUND OF THE INVENTION

This invention pertains generally to the formation of images describing a target area, and more particularly to the formation of such images using reflections of radar pulses.

In some instances, it is important for apparatus on board a guided missile or an airplane to identify objects on the ground without human interaction. For instance, a guided missile fired in the general direction of a target may carry object-identifying apparatus to precisely locate a target. It is known that a synthetic aperture radar (SAR) may be used in guided missiles to locate a target. The SAR produces signals that may be processed by an onboard computer to produce an image that may be analyzed by executing a pattern-matching program to identify a target in the image.

The SAR produces signals by transmitting radar pulses at different positions of the guided missile and receiving reflected pulses from objects on the ground. The reflected pulses at the different positions (forming a long synthetic aperture) provide detail about the target area. The onboard computer then processes reflected pulses at many different positions of the guided missile to produce an image with a resolution that approaches the resolution of a photographic image.

A major difficulty of using a SAR is the requirement for a precise measurement of the phases of the received reflected pulses relative to the phase of the transmitted pulses. The circuitry required to perform such phase comparisons has traditionally been large or costly to manufacture, and therefore ill-suited for use in a small, expendable missile.

SUMMARY OF THE INVENTION

With the just-outlined background of this invention in mind, it is an object of this invention to provide improved apparatus for forming an image describing an illuminated area.

It is also an object of this invention to provide simple and low cost apparatus for forming an image describing an illuminated area.

The foregoing and other objects of this invention are achieved by a radar apparatus comprising: (a) means, mounted on an aircraft, for repetitively transmitting radar pulses which vary in frequency in a predetermined manner; (b) means for receiving the radar pulses reflected from reflecting points in an illuminated area on the underlying terrain, each reflecting point being at a specific range from the aircraft and being displaced by a specific azimuthal angle from the direction of travel of the missile; (c) means for processing the received signals to form a first plurality of signals characterizing the illuminated area based on the difference in ranges between reflecting points taken in pairs; and (d) means for processing each of the first plurality of signals to form a second plurality of signals characterizing the illuminated area based on the difference in ranges between the reflecting points and the difference in azimuthal angle of the reflecting points taken in pairs.

BRIEF DESCRIPTION OF THE DRAWINGS

The present invention will be more fully understood with reference to the following detailed description and the FIGURES in which.

DESCRIPTION OF THE PREFERRED EMBODIMENT

A radar as here contemplated is similar in many ways to a conventional synthetic aperture radar (or SAR). Both types of radar are usually mounted on a moving aircraft and both are arranged to emit radar pulses and to receive reflections from objects illuminated by the transmitted radar signal. However, there are important differences between the radar here contemplated and a conventional SAR, particularly with respect to the form of the radar pulses and to the processing performed on the received radar reflections. In the following description, therefore, the important differences are fully explained and the features common to the radar here contemplated and a conventional SAR are only cursorily described.

Figure 1A:
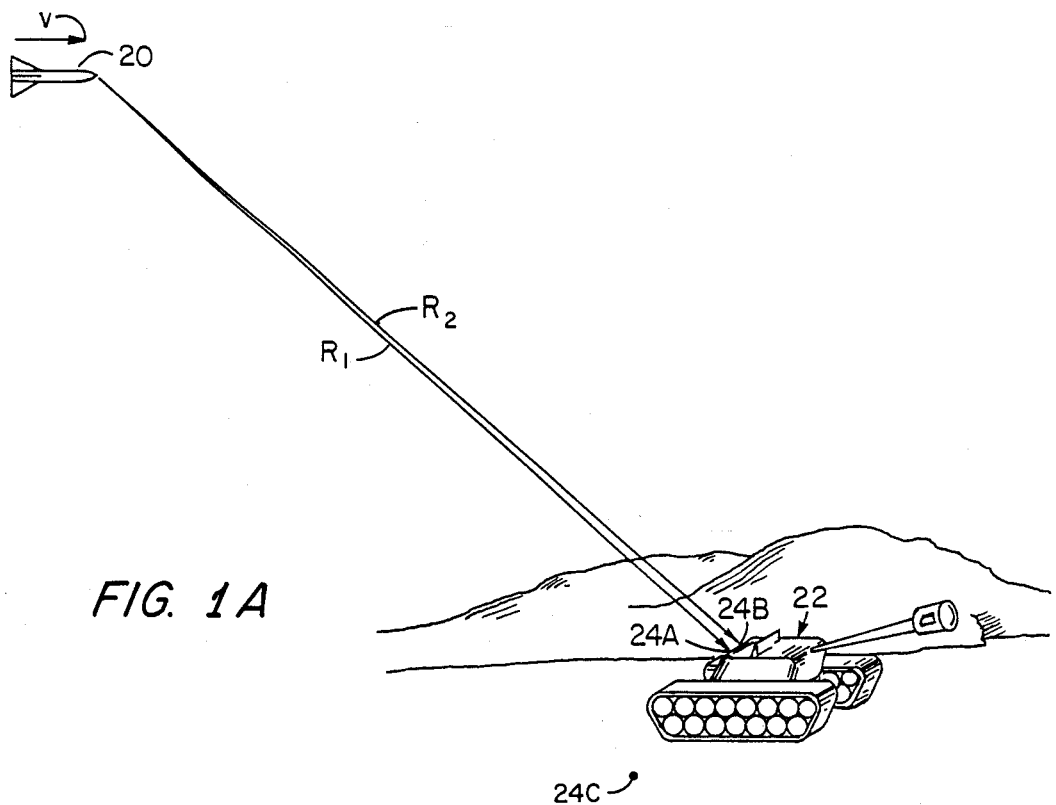
FIG. 1A is a sketch showing a scenario in which the invention may be used.

FIG. 1A shows a guided missile (hereinafter usually referred to as a missile 20) equipped with a radar to be described below. Missile 20 travels at a velocity, v, near a target 22 (here a tank). The radar on missile 20 emits radar pulses, described below. As pulsed radars are well known, details of the pulse formation and transmission are not provided.

Transmitted radar pulses are reflected by certain points on target 22 that are constructed of reflective material and are oriented so that reflected radar pulses from those points travel back to missile 20. Thus, for present purposes, the target 22 may be characterized as a set of discrete reflecting points. In FIG. 1A, reflecting points designated 24A and 24B are representative of a pair of reflecting points on the target 22. In any given target area, numerous other reflecting points (such as the point designated 24C) on background objects and other points (not shown) on the target 22 will create the set of reflected radar pulses received by the radar on missile 20. As will be described below, the set of reflected radar pulses is then processed to form a two-dimensional array of digital words which characterizes the reflecting points in the target area, including the reflecting points on target 22.

Figure 1B:
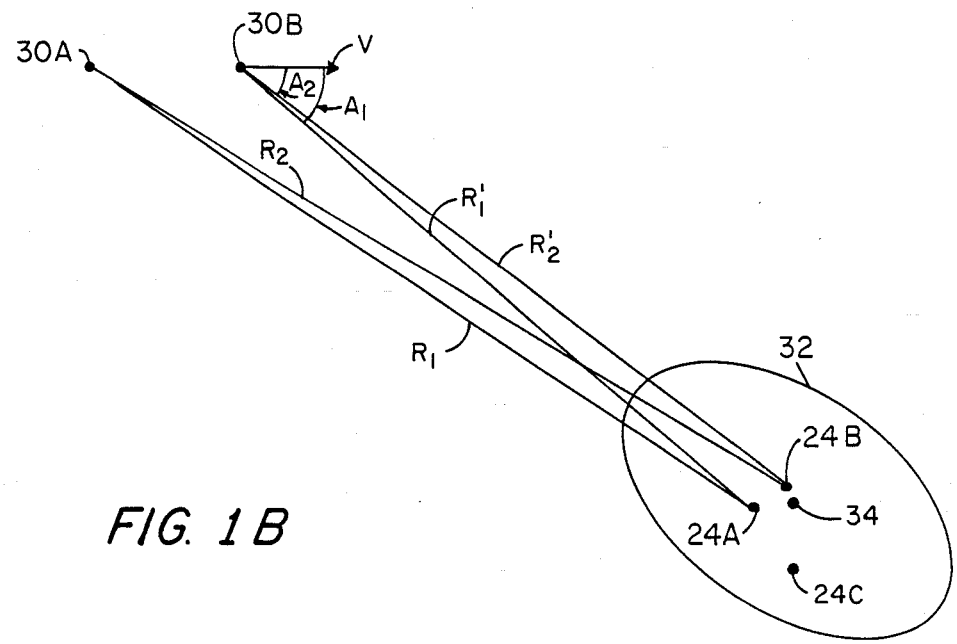
FIG. 1B is a sketch showing the important features of the geometry in FIG. 1A.

FIG. 1B shows the geometry of the paths between the radar on missile 20 and the reflecting points 24A and 24B. Since the missile 20 is traveling at velocity v, it will be at position 30A at one time and at position 30B at some subsequent time. The ranges between position 30A and reflecting points 24A and 24B are designated $R_1$ and $R_2$, respectively. As the position of the missile 20 changes, the range to each reflecting point 24A, 24B changes. The ranges between position 30B and reflecting points 24A, 24B are designated $R_1'$ and $R_2'$. It should be noted that the angle between the direction of travel of missile 20 and the line-of-sight between the missile 20 at any time and a reflecting point is denoted as the azimuthal angle of the reflecting point. For example, angle $A_1$ is the azimuthal angle of reflecting point 24B when missile 20 (FIG. 1A) is at position 30B.

Illuminated area 32 is the area on the ground in the path of the radar pulses transmitted from the radar in the missile 20 at a given time. Reference point 34 is some point within illumination area 32. Reference point 34 is not necessarily a reflecting point.

Figure 2A:
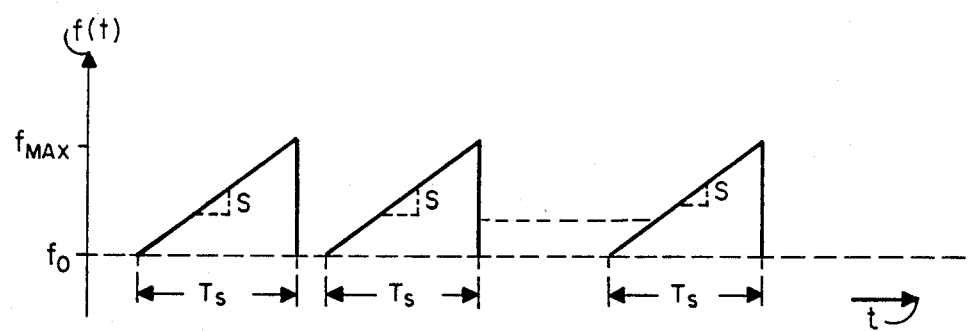
FIG. 2A is a sketch showing the frequency characteristics of the signal here contemplated to be transmitted.
Figure 2B:
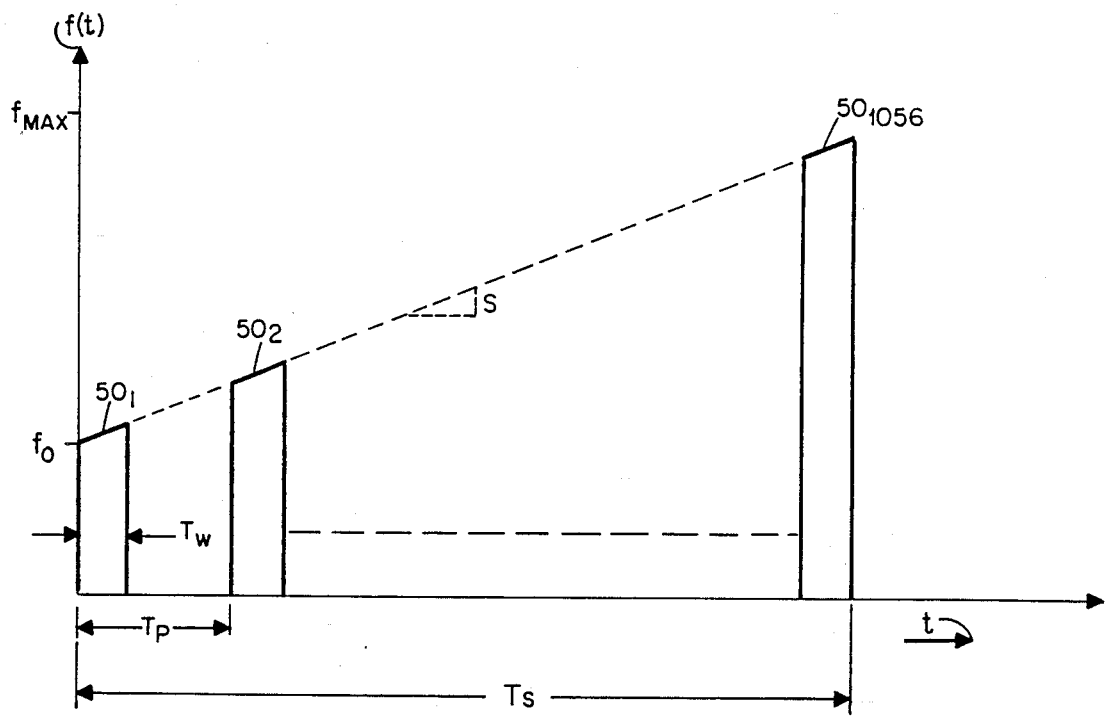
FIG. 2B is a sketch showing details of an exemplary pulse in FIG. 2A.

FIG. 2A shows that the frequency, f(t), within each one of the transmitted radar pulses changes as a function of time, t. The frequency of each one of the transmitted radar pulses varies linearly in time from a minimum frequency $f_0$ to maximum frequency $f_{max}$ during each sweep interval $T_s$. In FIG. 2A, the slope of the frequency versus time plot is denoted "S". It will be noted by one of skill in the art that the frequency of each radar pulse varies in a manner which creates what is often called a "chirp pulse." The apparatus needed to produce and transmit a chirp pulse is of known construction. Several chirp pulses are shown in FIG. 2B to be transmitted during a sweep interval $T_s$. A single chirp pulse is transmitted during each pulse repetition interval, $T_p$. Each transmitted radar pulse has a pulse width $T_W$ which is shorter than the pulse repetition interval $T_p$ so that time is available to receive and process reflected pulses before the occurrence of the next following transmitted radar pulse.

Figure 3:
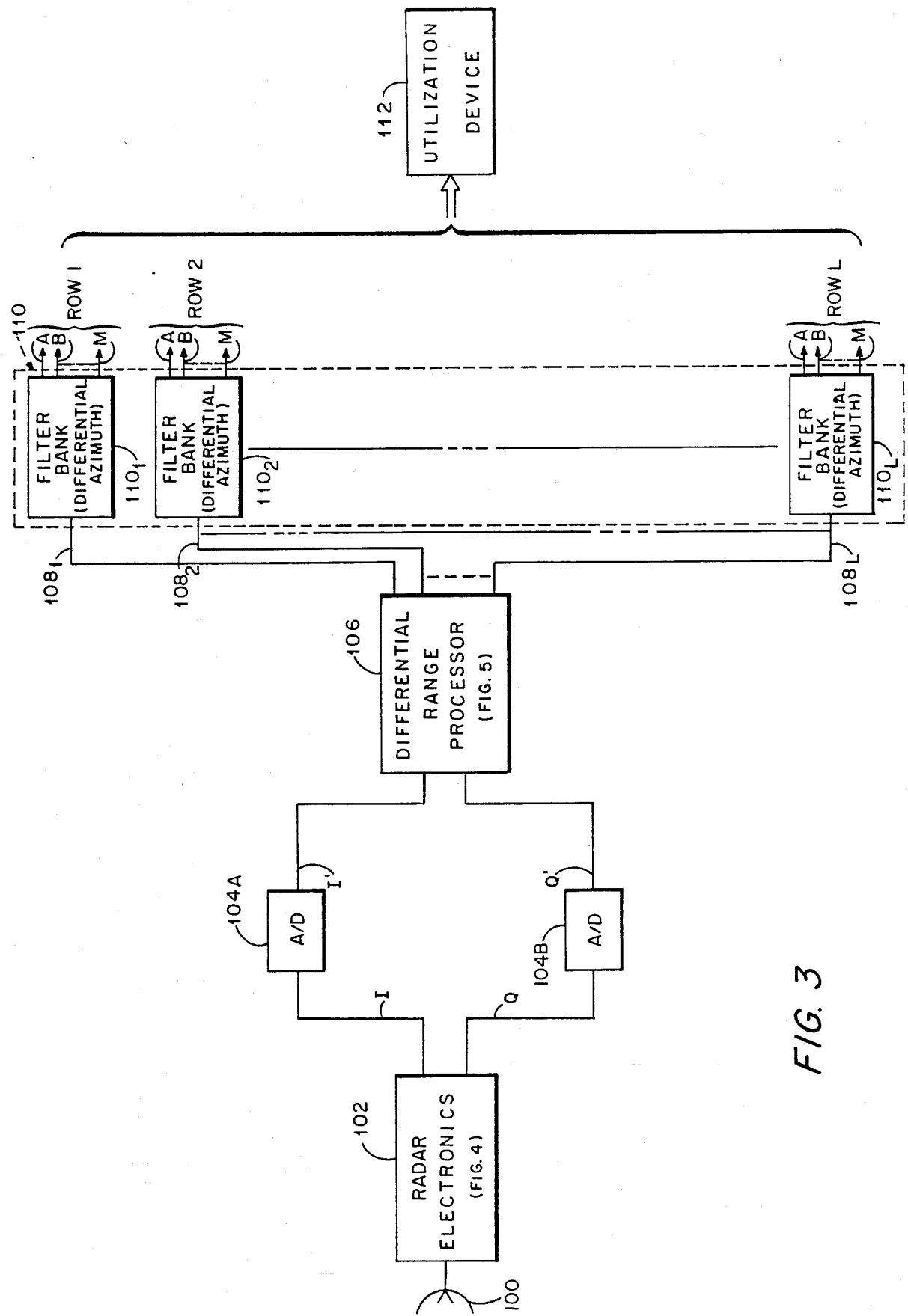
FIG. 3 is a generalized block diagram of the processing here contemplated to produce an image.

FIG. 3 shows a block diagram of the processing performed on reflected radar pulses in missile 20 (FIG. 1A). It will be noted by one of skill in the art that standard elements, such as power connections and control signals, are not explicitly shown.

Radar electronics 102 produce a pulsed radar signal having the characteristics shown in FIG. 2A and FIG. 2B. That signal is coupled to antenna 100 to be radiated therefrom as transmitted radar pulses. Such pulses travel to the illuminated area 32 (FIG. 1B) to be reflected from various reflecting points.

The reflected radar pulses travel back to the antenna 100 to be coupled therefrom to radar electronics 102. Radar electronics 102 then perform receiver functions such as amplification, noise filtering and demodulation of the reflected radar pulses. Each one of the reflected radar pulses is converted to an in-phase signal I and a quadrature phase signal Q within radar electronics 102. The block diagram of radar electronics 102 will be described in more detail in conjunction with FIG. 4 below. However, the components used to construct radar electronics 102 are used in many radar systems and are well known.

Figure 5:
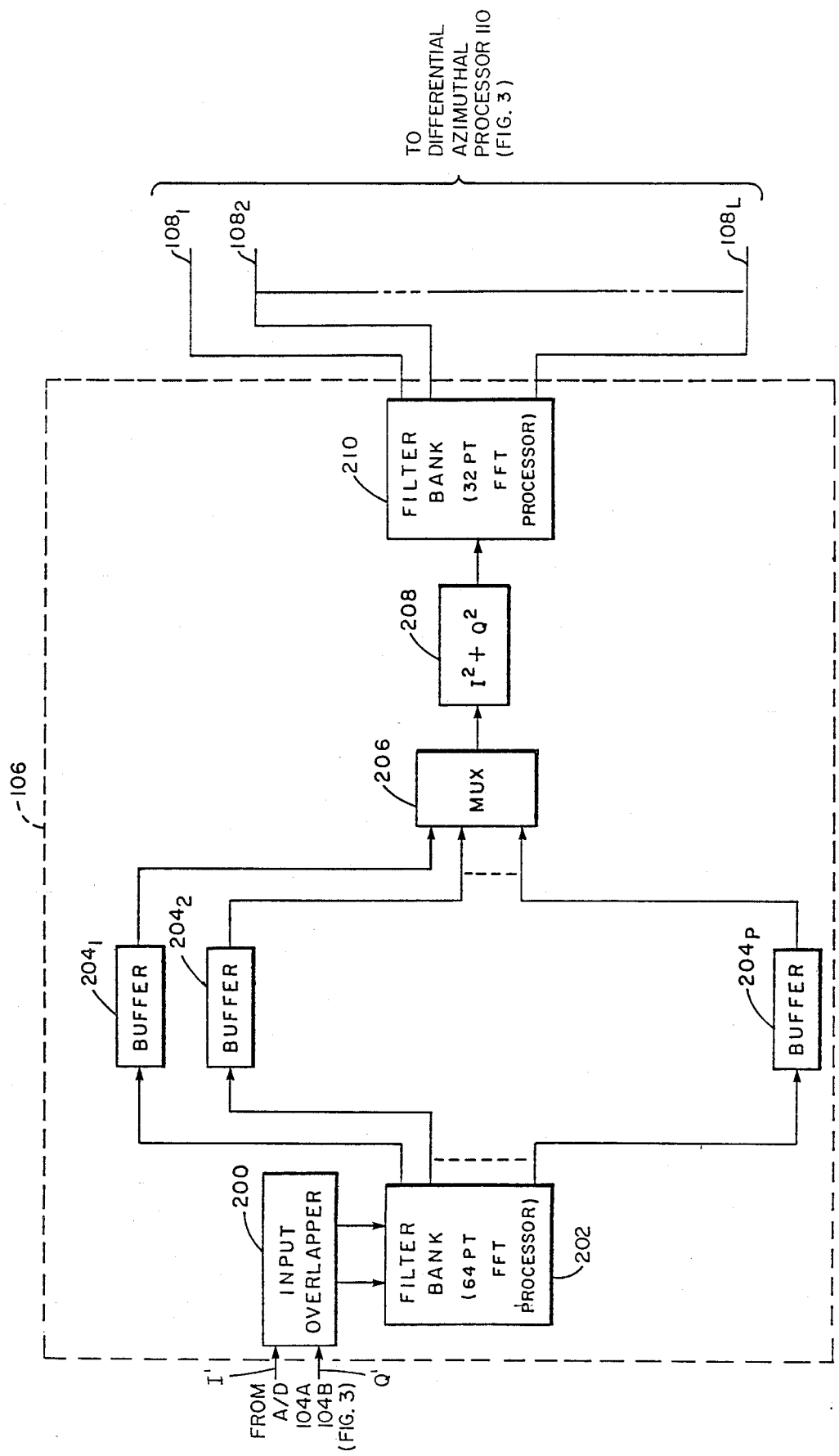
FIG. 5 is a generalized block diagram showing details of the differential range processor in FIG. 3.

The in-phase signal I and quadrature-phase signal Q produced by radar electronics 102 are fed to analog-to-digital converters 104A and 104B, respectively. Such analog-to-digital converters produce a digitized in-phase signal I' and a digitized quadrature-phase signal Q'. The digitized in-phase signal I' and digitized quadrature-phase signal Q' serve as inputs to the differential range processor 106 as shown in FIG. 5 and described hereinafter. Suffice it to say here that the differential range processor 106 has some number, here L, of outputs $108_1 \ldots 108_L$. Each of the outputs $108_1 \ldots 108_L$ corresponds to a group or "bin" of distances. Those distances represent differences in ranges between the pseudo-SAR and two reflecting points. For example, in FIG. 1B the differential range between reflecting points 24A and 24B is $|R_1-R_2|$. One of the outputs of differential range processor 106 (say output $108_1$) corresponds to a bin encompassing the distance $|R_1-R_2|$. In response to an input signal containing reflections from reflecting points 24A and 24B, differential range processor 106 causes an output signal to appear on the output $108_1$. In this way the output signals of differential range processor 106 characterize objects within the illuminated area 32.

As mentioned above, numerous reflecting points may fall within the illuminated area 32. The input signal to differential range processor 106 may therefore contain a superposition of reflections from numerous reflecting points which, when taken in pairs, are separated by distinct differential ranges. Each of the pairs of reflecting points contributes to one of the output signals $108_1 \ldots 108_L$, depending on whether that particular pair has a differential range falling in the range bin corresponding to that output signal. Each of the outputs $108_1 \ldots 108_L$ therefore represents the superposition of contributions from all pairs of reflecting points separated by a differential range falling in the range bin corresponding to that output.

In the case shown in FIG. 1A, a target 22 is in the illuminated area 32. For much of the flight of missile 20, the reflecting points on the target 22 may be characterized by reflecting points at relatively fixed differential ranges. Thus, a particular pattern of differential ranges will be associated with any target. The particular pattern of differential ranges for any target is reflected in the relative values of all of the outputs $108_1 \ldots 108_L$ (FIG. 3). Any given target will create a characteristic pattern at the outputs $108_1 \ldots 108_L$ (FIG. 3). Thus, identification of a target may be effected by comparing the pattern at the outputs $108_1 \ldots 108_L$ to the characteristic patterns of different known objects and determining when the best match occurs.

There is a problem, however, with using the outputs $108_1 \ldots 108_L$ to identify targets. Several different targets may produce substantially the same pattern at outputs $108_1 \ldots 108_L$. Additionally, background clutter may cause two very different targets to produce patterns that are indistinguishable one from the other. To avoid such problems, each of the outputs $108_1 \ldots 108_L$ is further processed.

Each of the outputs $108_1 \ldots 108_L$ feeds a filter bank $110_1 \ldots 110_L$ in azimuthal processor 110. Each filter bank $110_1 \ldots 110_L$ has some number, M, of outputs. Each one of the M outputs of each filter bank $110_1 \ldots 110_L$ corresponds to a bin of differential azimuthal angles. For example, in FIG. 1B the vector between position 30B and reflecting point 24A is at an azimuthal angle of $A_1$ with respect to the direction of travel of the missile 20 (FIG. 1A). Similarly, reflecting point 24B is at an azimuthal angle $A_2$. The differential azimuthal angle for the pair of reflecting points 24A and 24B is $|A_1-A_2|$. One of the outputs of the filter bank $110_1$ (say output "A") corresponds to an azimuthal bin encompassing the angle $|A_1-A_2|$.

The pair of reflecting points 24A, 24B (FIG. 1B) causes an output signal on only one of the outputs of one of the filter banks $110_1 \ldots 110_L$ (say output A from filter bank $110_1$). Differential range processor 106 caused the contribution from the pair of reflecting points 24A, 24B to appear on one output line $108_1$. Thus, the signal representing that pair of reflecting points was only an input to the filter bank $110_1$ and appears only at output "A" of filter bank $110_1$.

Where the reflected signal represents the superposition of reflections from many reflecting points, differential range processor 106 directs the contributions from those reflecting points to different ones of the outputs $108_1 \ldots 108_L$. Thus, each of the filter banks $110_1 \ldots 110_L$ has a different input. Where each of the inputs to the differential azimuthal processors 110 represents a superposition of contributions from pairs of reflecting points, the outputs of each filter bank $110_1 \ldots 110_L$ similarly represent the superposition of the contributions from all the pairs of reflecting points.

The outputs of the filter banks $110_1 \ldots 110_L$ are conceptually formed into a two-dimensional array. The M outputs of each filter bank $110_1 \ldots 110_L$ make up one row of such two-dimensional array. Because there are L filter banks, there are L rows in the array. The output of the improved radar is thus an L×M array.

Each entry in the L×M array corresponds to a range bin and in azimuth bin. The value of a particular entry in the array represents the contributions of all pairs of reflecting points with differential ranges in that range bin and with differential azimuthal angles in the azimuth bin.

Utilization device 112 receives the entire L×M array and identifies a particular target from the entries of the array. Each target has a set of reflecting points separated by fixed distances to create a pattern of values in the L×M array. Different targets may still produce substantially the same patterns, but the likelihood of the occurrence of such patterns is much less than would be the case were only the differential ranges of the reflecting points used to produce the patterns. If the patterns of values from important targets are known a priori, the actual pattern in the output array may be compared to those patterns to determine if one of the important targets is in the illuminated area 32 (FIG. 2). Where the pseudo-SAR is installed in a missile, utilization device 112 might actually be part of the missile guidance system. The guidance system might cause any number of results based on the results of comparisons indicating important targets in the illuminated area 32 (FIG. 1B).

DETAILS AND THEORY OF OPERATION

Figure 4:
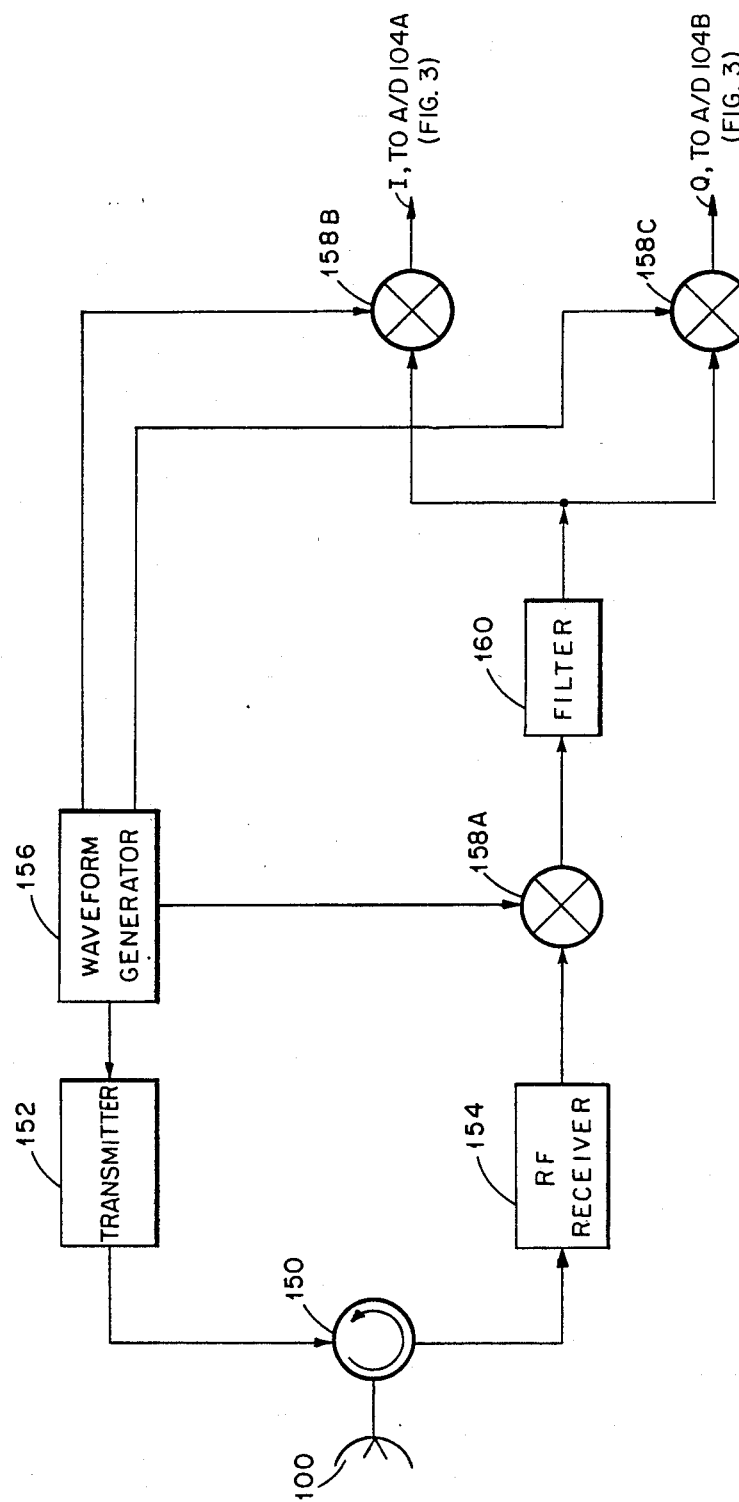
FIG. 4 is a generalized block diagram showing details of the analog electronics in FIG. 3.
Figure 6:
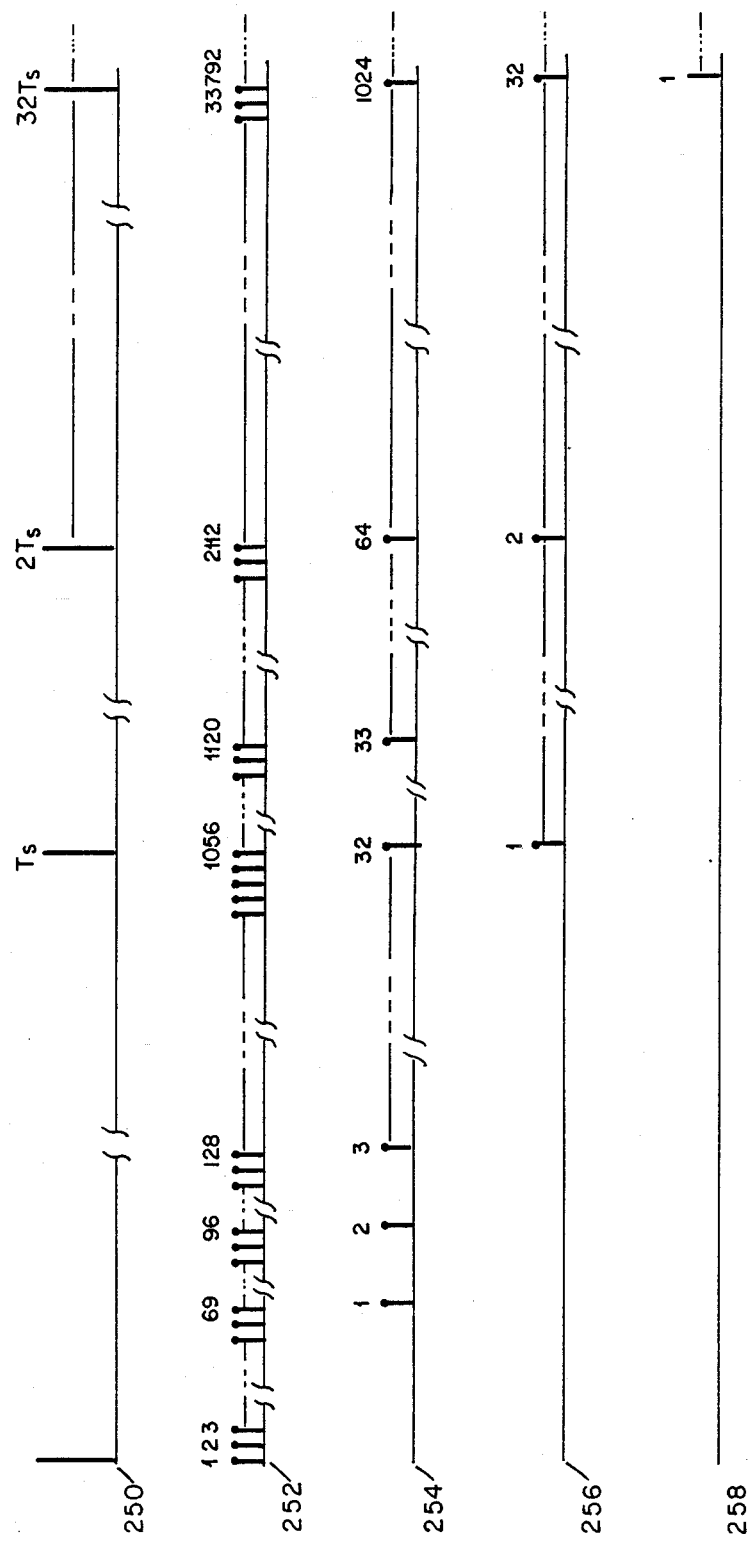
FIG. 6 is a sketch showing the timing of operation of various processing elements shown in FIG. 3.

The way in which an L×M array characterizing the illuminated area 32 (FIG. 1B) is reproduced may be more fully understood by reference to FIGS. 4, 5 and 6.

FIG. 4 shows a waveform generator 156 passing a radio frequency signal to a transmitter 152. The radio frequency signal is modulated with the frequency characteristics shown in FIG. 2A and is pulsed as shown in FIG. 2B. The radio frequency signal is amplified in transmitter 152 and then is passed through a circulator 150 to an antenna 100 and radiated therefrom as the transmitted radar pulses. The functions performed by waveform generator 156, transmitter 152 and circulator 150 are common functions in pulsed radar systems. Those components could be readily constructed by one of skill in the art.

The transmitted signal may be represented mathematically as $$G_T(t) \cos[2\pi(f_o+(St/2))t+\phi_T] \qquad \text{Eq. (1)}$$

where $G_T(t)$ is a function equal to 1 while the pulse is being transmitted and 0 while no pulse is being transmitted as shown in FIG. 2B;

$f_o$ is the initial frequency of the radio frequency signal to be transmitted at the beginning of each pulse (as shown in FIG. 2B);

S is the slope of the frequency profile of the radio frequency signal to be transmitted (as shown in FIG. 2B);

t is a variable representing time; and $\phi_T$ is a constant representing the phase of the transmitted signal.

The radio frequency signals out of the antenna 100, i.e., the transmitted pulses, are directed in a beam (not shown) to the illuminated area 32 (FIG. 1B) wherein reflection from each one of $N_T$ reflecting points occurs as reflected pulses. The reflected pulses are incident on the antenna 100 (FIG. 3) and are coupled therefrom to the RF receiver 154 via the circulator 150.

The received signal consists of a superposition of the reflected pulses from the separate reflecting points. The reflection from the $i^{th}$ reflecting point is given by $$A_i G_T(t-t_i)\cos[2\pi(f_o+S(t-t_i)/2)(t-t_i)+\phi_T+\phi_i] \qquad \text{Eq. (2)}$$

where $A_i$ represents the amplitude of the reflected signal from the $i^{th}$ reflecting point at the antenna;

$\phi_i$ is the phase shift upon reflection;

$t_i$ is the round trip propagation delay to and from the pseudo-SAR to the $i^{th}$ reflecting point;

and the remaining terms are as defined in connection with Eq. (1).

From elementary physical considerations, $t_i$ equals $2R_i/c$ where $R_i$ is the range to the $i^{th}$ reflecting point and c is the speed of light. By using this relationship in Eq. (2), the reflected signal from the $i^{th}$ reflecting point may be described by $$A_i G_T(t-t_i)\cos[2\pi((f_o+St/2)-2S R_i/c)t-4\pi f_o R_i/c+\phi_T+\phi_i] \qquad \text{Eq. (3)}$$

RF receiver 154 amplifies and filters the received signal. Such signal is then downconverted to a first intermediate frequency (IF) signal by heterodyning in a mixer 158A with a first local oscillator signal produced by waveform generator 156. As is known in the art, mixer 158A translates the frequency of the received signal by an amount equal to the frequency of the first mixing signal. The frequency of the first mixing signal is thus selected to translate the frequency of the received signal into a frequency range which can be practically worked with by conventional components. As can be seen from Eq. (3), the received signal has a frequency approximately equal to $$((f_o+St/2)-2S R_i/c). \qquad \text{Eq. (4)}$$

Waveform generator 156 thus produces a first mixing signal of the form $$\cos[2\pi(f_c+St/2-2S R_r/c)t+\phi_T] \qquad \text{Eq. (5)}$$

where $f_c$ is a frequency less than $f_o$; and $R_r$ is the range to a reference point 34 (FIG. 1B) in the illuminated area 32 (FIG. 1B).

The signal out of mixer 158A for the reflection from the $i^{th}$ reflecting point is thus of the form:

$$A_i \cos[2\pi(f_{IF}-2S\,R_{ir}/c)\,t+4\pi S\,R_i^2/c^2-4\pi f_o R_i/c+\phi_i]  \quad \text{Eq. (6)}$$

where $f_{IF}$ equals $f_o-f_c$; and
$R_{ir}$ equals $R_i-R_r$.

One skilled in the art will note that the expression for the output of mixer 158A contains a term derived from a difference between two radio frequency signals and a term indicative of the distance of a reflecting point from a reference point. The portion of the output of mixer 158A representing the sum of two radio frequency signals is not considered because that portion is far removed from the passband of the bandpass filter 160. Additionally, one will note that the function $G_T(t)$ does not appear in the expression for the output of the mixer 158A. As will be clear later, that function equals 1 during all times of interest and can be ignored.

The frequency of the reflected pulse from the $i^{th}$ reflecting point after mixing then essentially equals $(f_{IF}-2S\,R_{ir}/c)$.

The first IF signal out of mixer 158A is filtered by filter 160. Filter 160 is a bandpass filter with a passband centered near $f_{IF}$. If the $i^{th}$ reflecting point is exactly at reference point 34 (FIG. 1B), the frequency of the reflected pulse from that point is simply $f_{IF}$, because $R_{ir}$ then equals 0. When the distance $R_{ir}$ is not zero (i.e., when the $i^{th}$ reflecting point is not coincident with the reference point 34 (FIG. 1B)), the frequency of the $i^{th}$ reflected pulse differs from $f_{IF}$. By adjusting the passband of filter 160, reflected pulses from reflecting points too far from reference point 34 (FIG. 1B) may be removed. An important consequence of the filtering is that the reflected pulses from every reflecting point in illuminated area 32 (FIG. 1B) need not be processed. Only those reflecting points within a predetermined distance of reference point 34 need to be considered. The end result is that the effects of spurious reflections or noise are lessened.

The filtered signal out of the filter 160 is evenly split and fed to mixers 158B and 158C. Waveform generator 156 generates an in-phase mixing signal which is also fed to mixer 158B. That signal may be represented as $$\cos[2\pi f_{IF} t] \quad \text{Eq. (7)}$$

Waveform generator 156 also generates a quadrature phase mixing signal fed to mixer 158c. That signal may be represented as $$\sin[2\pi f_{IF} t] \quad \text{Eq. (8)}$$

The outputs of the mixers 158B and 158C are thus in quadrature at baseband.

The outputs of the mixers 158B, 158C are fed to the A/D converters 104A and 104B (FIG. 3) for conversion to digital signals I',Q'. Sample timing in A/D converters 104A and 104B will be understood by referring to FIG. 2B and FIG. 6. FIG. 2B shows pulses $50_n$ transmitted every $T_p$ seconds. The radar waits for the reflection of the pulse before transmitting the next pulse. During the wait, the A/Ds 104A and 104B (FIG. 3) take a sample of the reflected pulse. As can be seen in FIG. 2B, 1056 pulses are transmitted during each sweep interval $T_s$. FIG. 6 shows sampling pulses, i.e., the relative times in A/D converters 104A, 104B (FIG. 3) when samples are taken of the baseband signals out of the mixers 158B, 158C. Timeline 250 shows, for reference purposes, the consecutive sweep intervals $T_s$. Timeline 252 shows the relative times of samples taken by A/D converters 104A and 104B (FIG. 3). Here 1056 evenly spaced samples are taken during each sweep interval $T_s$.

The I' and Q' signals produced by A/Ds 104A and 104B feed differential range processor 106. One skilled in the art will recognize that well known digital signal processing techniques are actually employed to perform the desired processing.

The component of the I' signals contributed by a reflection from the $i^{th}$ reflecting point is of the form $$\cos[2\pi(-2S\,R_{ir}/c)t+4\pi S\,R_i^2/c^2-4\pi f_o R_i/c+\phi_i] \quad \text{Eq. (9)}$$

The Q' signal is the same as the I' signal, except 90° out-of-phase.

In actuality, the received signal is made up of many superposed reflected pulses from numerous reflecting points in the illuminated area 32 (FIG. 1B). The signal may therefore be represented as $$I = \sum_{i=1}^{N_F} A_i \cos[2\pi(-2S\,R_{ir}/c)t + 4\pi S\,R_i^2/c^2 - 4\pi f_o R_i/c + \phi_i] \quad \text{Eq. (10)}$$

where $N_F$ is the number of frequency components passed by filter 160 (FIG. 4). It will be noted that the components filtered out by filter 160 (FIG. 4) are not included in the summation. The Q signal may be represented by a similar equation, except phase-shifted by 90°.

A target in the illuminated area 32 (FIG. 1B) is found by processing signal I' and a similar Q' signal which is 90° out-of-phase with the signal I. If the illuminated area 32 (FIG. 1B) is large relative to the size of a target, the received signal will likely contain reflected pulses from many reflecting points not on the target. Filter 160 removed the reflections of some points from the signal.

To further avoid errors which could result from such processing, the signal processing within the radar tries to reduce the number of reflections considered at one time. As can be seen in Eq. (10), the frequency of each component of the I signal is essentially proportional to $(2S\,R_{ir}/c)$. All the reflecting points which are close together have similar values of $R_{ir}$. It follows then that the frequencies of the reflected pulses from closely spaced reflecting points are close together. Still further, it follows that the baseband signals are similarly spaced and that if the baseband signals are grouped, the reflecting points may be considered to be grouped in accordance with the values of $R_{ir}$.

This grouping of components by frequency is performed by filter bank 202 (FIG. 5). The filter bank 202 accepts an input signal, here by the I' and Q' signals. The filter bank 202 has some number of outputs, here P. Each output corresponds to a particular "bin" of frequencies. To a close approximation, it may be considered that each frequency component of the input signal is passed straight through the filter bank to a corresponding frequency bin.

Figure 1C:
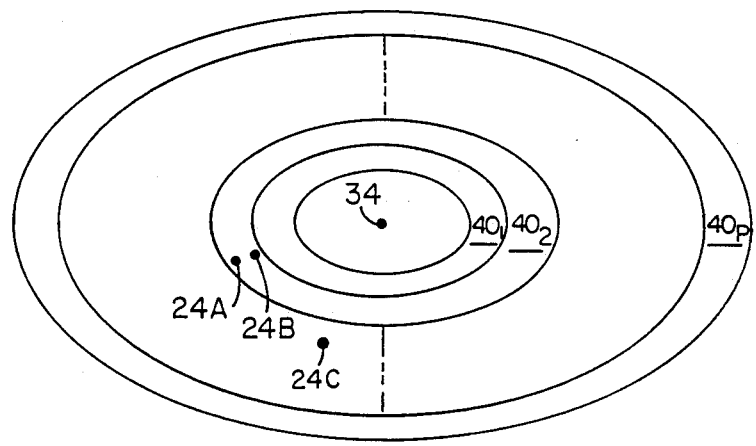
FIG. 1C is a sketch showing exemplary range rings which the invention may resolve.

The sorting by frequency is an analog of sorting by the value of $R_{ir}$. FIG. 1C shows rings around reference point 34 corresponding to the sorting by frequency performed by filter bank 202 (FIG. 5). Each of the differential range rings, $40_1 \ldots 40_p$, corresponds to one output of filter bank 202 (FIG. 5). For example, the reflecting points 24A and 24B here fall in range ring $40_2$. The components of the reflected pulses from reflecting points 24A, 24B would thus be part of the signal at the corresponding output of the filter bank 202 (FIG. 5).

Referring now to FIG. 5, it can be seen that filter bank 202 is implemented using well known digital processing components. It is known that by repeatedly performing a Fast Fourier Transform (FFT) on a signal, the outputs of the FFT approximate the results which would be obtained by a bank of bandpass filters. Thus, the major part of filter bank 202 is a 64 point FFT processor. It should be noted that FFT processor 202 is a complex FFT processor. The I' and Q' signals make up the real and imaginary parts of the input. Each output value similarly has a real and imaginary part.

Input overlapper 200 feeds consecutive groups of 64 samples to FFT processor 202. However, the last 32 samples of one group of 64 become the first 64 samples in the next group. Input overlapper 200 is constructed from well known digital components. It consists essentially of digital memory and control circuitry.

FIG. 6 shows the sample times of the output of filter bank 202. Timeline 252 shows the sampling times of the A/D 104A and 104B (FIG. 3). Timeline 254 shows the times when samples are produced by filter band 202 (FIG. 5). Starting at the beginning of one sweep interval, $T_s$, the first sample of the output of filter bank 202 (FIG. 5) is produced after 64 samples of filter bank 202. Another output sample of filter bank 202 (FIG. 5) is produced for each group of 32 more samples during the rest of the sweep interval.

Referring again to FIG. 5, each of the outputs of filter bank 202 is stored in one of the buffers $204_1 \ldots 204_p$, as shown. Each buffer comprises digital memory capable of storing at least 32 samples of a signal. Each buffer $204_1 \ldots 204_p$ contains the signal corresponding to the reflected pulses from reflecting points in a particular range ring $40_1 \ldots 40_p$ (FIG. 1C).

A multiplexer 206 selects the signal in one of the buffers $204_1 \ldots 204_p$ for further processing. In actuality, the hardware following multiplexer 206 might be time-multiplexed so that the signals in several of the buffers $204_1 \ldots 204_p$ may be processed in any processing The signal selected by multiplexer 206 has an in-phase and quadrature phase portion given by:

$$I = \sum_{i=1}^{N} A_i \cos [2\pi(2SR_{ir}/c)t + 4\pi S R_i^2/c^2 - 4\pi f_o R_i/c + \phi_i] \quad \text{Eq. (11)}$$

$$Q = \sum_{i=1}^{N} A_i \sin [2\pi(2SR_{ir}/c)t + 4\pi S R_i^2/c^2 - 4\pi f_o R_i/c + \phi_i] \quad \text{Eq. (12)}$$

where N is the number of reflecting points in the range ring selected by multiplexer 206. Processor 208 squares the in-phase portion and the quadrature-phase portion of the signal. The squared portions are then added together. A moment's thought will make it clear that the output of processor 208 is of the form:

$$I^2 + Q^2 = \sum_{i=1}^{N} A_i^2 + 2 \sum_{\substack{i=1 \\ i \neq j}}^{N} \sum_{j=1}^{N} A_i A_j \cos (a_i - a_j) \quad \text{Eq. (13)}$$

where $$a_i = [2\pi S(2R_{ir}/c)t + 4\pi S R_i^2/c^2 - 4\pi f_o R_i/c + \phi_i]; \text{ and}$$

$$a_j = [2\pi S(2R_{jr}/c)t + 4\pi S R_j^2/c^2 - 4\pi f_o R_j/c + \phi_j];$$

so that $$a_i - a_j = 4\pi S (R_i - R_j) t/c - 4\pi/c (f_o - S(R)_i + R_j)/c (R_i - R_j) + \phi_{ij} \quad \text{Eq. (14)}$$

where $\phi_{ij} = \phi_i - \phi_j$. A nonlinear term $(R_i^2 - R_j^2)$ is not included in Eq. (14) because it is negligible.

By reference to Eq. (13), it may be seen that the output of the processor 208 contains a superposition of terms which are essentially constant plus a superposition of cosinusoidal terms with arguments equal to $(a_i - a_j)$. Each cosinusoidal term is called a "beat frequency component." The name reflects the well known physical phenomenon that the product of two cosinusoids is a sinusoid which "beats" at a frequency equal to the difference in frequency of the original cosinusoids. Here, the components $\cos(a_i - a_j)$ come from two cosinusoids multiplied together at processor 208 when the I and Q components are squared.

The frequency of each beat frequency component is essentially $4\pi S (R_i - R_j)/c$. As is known, the frequency of a cosinusoid equals the first derivative of its argument with respect to time. The frequency cannot be said to be exactly $4\pi S(R_i - R_j)/c$, however, because $R_i$ and $R_j$ will change over time since the missile 20 (FIG. 1A) is moving. But such changes are small in contrast to $4\pi S(R_i - R_j)/c$ and may safely be neglected.

The output of processor 208 is fed to a filter bank 210 (here an FFT processor). Filter bank 210 has some number of outputs, L. Each output corresponds to a bin of frequencies. Frequency components in the input signal to filter bank 210 may be considered to pass straight through the filter to the output line corresponding to the bin in which that frequency component falls. Since the frequency of the beat frequency components is essentially $(2S(R_i - R_j)/c)$, the frequency is proportional to the differential range $(R_i - R_j)$. Thus, when filter bank 210 sorts beat frequency components into frequency bins it is also sorting them into differential range bins. Here, filter bank 210 is a 32 point FFT processor. By comparison of timelines 254 and 256 in FIG. 6 it can be seen that filter bank 210 produces one output for each 32 outputs of filter bank 202. By comparison of timelines 250 and 256 it can be seen that filter bank 210 produces one output for each sweep interval $T_s$.

The outputs of filter bank 210 (FIG. 5) are the outputs of differential range processor 106 (FIG. 3). Thus, the outputs of differential range processor 106 have the beat frequency components sorted into frequency bins. Since the frequency of each beat frequency component is proportional to $(R_i - R_j)$ of the reflecting points giving rise to that component, the outputs of differential range processor 106 can also be thought of as having sorted the beat frequency components into differential range bins.

Analytically, the signal on any one of the output lines $108_1 \ldots 108_L$ of differential range processor 106 may be represented as $$\sum_{\substack{i=1 \\ i \neq j}}^{N_R} \sum_{j=1}^{N_R} A_i A_j \cos[-4\pi(f_o - S(R_i + R_j)/c)(R_i - R_j)/c + \phi_{ij}] \quad \text{Eq. (15)}$$

where $N_R$ is the number of beat frequency components created by reflecting points separated by a differential range in the differential range bin corresponding to the output $108_i$.

Each of the outputs of differential range processor 106 feeds a filter bank $110_1 \ldots 110_L$ (FIG. 3). As with the case of filter bank 210, each of the filter banks $110_1 \ldots 110_L$ is a 32 point FFT processor. Timeline 258 (FIG. 6) shows one output of each filter bank for each 32 outputs of FFT processor 210 (FIG. 5) and for each 32 sweep intervals $T_s$.

As described above, each filter bank $110_1 \ldots 110_L$ sorts the components of its input signal into "bins" corresponding to differential azimuthal angle. The correspondence between the differential azimuthal angle bins and the frequency bins of one of the filter banks $110_1 \ldots 110_L$ can be seen by reference to Eq. (15)

The input to each differential azimuthal filter bank $110_1 \ldots 110_L$ is a superposition of cosinusoids of the form $$A_i A_j \cos[4\pi(f_o - S(R_i + R_j)/c)(R_i - R_j)/c + \phi_{ij}] \quad \text{Eq. (16)}$$

The frequency of these cosinusoids equals the time derivative of the argument. In this case, that time derivative is non-zero because of the changes in $R_i$ and $R_j$ (i.e., the range changes as missile 20 (FIG. 1A) approaches the target. This can be more clearly seen by the approximation $$R_i - R_j \approx R_i(t_o) - R_j(t_o) - [R_i'(t_o) - R_j'(t_o)](t - t_o) \quad \text{Eq. (17)}$$

where $R_i(t_o)$ and $R_j(t_o)$ are the values of $R_i$ and $R_j$ at some reference time, $t_o$; and $R_i'(t_o)$ and $R_j'(t_o)$ are the first derivatives with respect to time of $R_i$ and $R_j$ evaluated at some reference time $t_o$.

To see the dependence on azimuthal separation, the approximation $$R_i'(t_o) - R_j'(t_o) \approx W X_{ij} \quad \text{Eq. (18)}$$

may be used where W is the angular velocity of missile 20 (FIG. 1A) normal to the plane defined by the velocity vector V, (FIG. 1A) of the missile 20 and the vector from the missile 20 to the center of the range ring $40_1 \ldots 40_P$ (FIG. 1C) corresponding to the output of filter bank 202 selected by multiplexer 206 (FIG. 5), and $X_{ij}$ is the azimuthal angular separation of the $i^{th}$ and $j^{th}$ reflecting points. By making these substitutions into Eq. (17), it can be seen the frequency of the components into each of the filter banks $110_1 \ldots 110_L$ is $$4\pi(f_o - S(R_i + R_j)/c) W X_{ij} \quad \text{Eq. (19)}$$

Thus, the frequency of the components of the input signal is proportional to $X_{ij}$. The frequency bins formed by filter banks $110_i$ therefore correspond to differential azimuthal bins.

Thus, each of the components contributes an amount essentially equal to $A_i A_j$ to the output signal corresponding to the differential azimuthal bin in which the pair of reflecting points which gave rise to that component falls. Thus, each output signal will consist of an in-phase signal of the form $$\sum_{\substack{i=1 \\ i \neq j}}^{N_A} \sum_{j=1}^{N_A} A_i A_j \cos[\phi_{ij}] \quad \text{Eq. (20)}$$

and a similar quadrature phase signal where $N_A$ is the number of pairs of reflecting points falling into that particular azimuthal bin.

The number, $N_A$, of pairs of reflecting points contributing to any given output signal can be adjusted by changing the signal processing parameters. If the number $N_A$ is made very small, the likelihood of an error in identifying a target is also small. For example, the number of pairs of reflecting points falling in each range bin can be made smaller by reducing the "width" of each frequency bin. The width can be reduced by increasing the time during which samples are taken to compute one array of output data provided to utilization 112 (FIG. 3).

Having described a preferred embodiment of this invention, it will now become apparent to one of skill in the art that many changes and modifications may be made without departing from the inventive concepts. It is felt, therefore, that this invention should not be restricted to the disclosed embodiment, but rather should be limited only by the spirit and scope of the appended claims.

What is claimed is:

1. A radar apparatus mounted on an aircraft comprising:
   (a) means for transmitting radar pulses towards an illuminated area;
   (b) means for receiving radar pulses reflected from a first plurality of reflecting points in the illuminated area;
   (c) means, responsive to the means for receiving radar pulses, for forming a second plurality of signals characterizing the illuminated area based on the difference in ranges between the aircraft and each of the first plurality of reflecting points taken in pairs; and
   (d) means, responsive to the second plurality of signals, for producing a third plurality of signals characterizing the illuminated area based on the difference in ranges between the aircraft and each of the first plurality of reflecting points taken in pairs and the difference in azimuthal angle between the aircraft and each of the first plurality of reflecting points taken in pairs.

2. The radar apparatus as in claim 1 wherein the means for forming a second plurality of signals comprises:
   (a) a first FFT processor having a plurality of outputs, each output having a real component and an imaginary component;
   (b) computing means, responsive to one of the plurality of outputs of the first FFT processor, for forming the sum of the real component squared and the imaginary component squared; and (c) a second FFT processor, responsive to the computing means, such second FFT processor having a plurality of outputs.

3. The radar apparatus of claim 2 wherein the means for producing the third plurality of signals comprises means to compute a second plurality of FFT, each such means responsive to one of the second plurality of signals.

4. A method of operating a radar comprising the steps of:

(a) receiving an in-phase and quadrature-phase signal;
(b) computing the sum of the squared in-phase and squared quadrature-phase signals;
(c) filtering components of the sum into a first plurality of bins of frequencies; and
(d) filtering the components in each bin into a second plurality of bins of frequencies.

* * * * *